United States Patent [19]

Higgins

[11] Patent Number: 5,481,268
[45] Date of Patent: Jan. 2, 1996

[54] DOPPLER RADAR SYSTEM FOR AUTOMOTIVE VEHICLES

[75] Inventor: J. Aiden Higgins, Westlake Village, Calif.

[73] Assignee: Rockwell International Corporation, Seal Beach, Calif.

[21] Appl. No.: 277,466

[22] Filed: Jul. 20, 1994

[51] Int. Cl.$^6$ ................................................ G01S 13/93
[52] U.S. Cl. ........................... 342/70; 342/111; 342/112; 342/117
[58] Field of Search .............................. 342/70, 71, 72, 342/111, 112, 116, 117

[56] References Cited

U.S. PATENT DOCUMENTS

| | | | |
|---|---|---|---|
| 5,008,678 | 4/1991 | Herman | 342/70 |
| 5,019,829 | 5/1991 | Heckman et al. | 343/700 MS |
| 5,181,037 | 1/1993 | Komatsu | 342/70 |
| 5,268,692 | 12/1993 | Grosch et al. | 342/70 |
| 5,315,303 | 5/1994 | Tsou et al. | 342/27 |

OTHER PUBLICATIONS

IEEE Standard Dictionary of Electrical and Electronics Terms, Third Edition, "leakage", p. 482, 1984.

*Primary Examiner*—Stephen C. Bentley
*Attorney, Agent, or Firm*—John C. McFarren

[57] ABSTRACT

A continuous wave Doppler radar system having a transmitter module and a receiver module is provided for automotive vehicles. Each module includes an antenna system, including a horn, a lens, and a waveguide system, which is attached to a monolithic microwave integrated circuit (MMIC) chip that provides all necessary electronic functions. Each MMIC chip may be attached to a metal base heat sink, which may be conveniently connected to a base plate heat sink that holds the entire radar assembly. The transmitter module includes a voltage controlled oscillator (VCO) that generates a VCO frequency signal which is amplified and switched sequentially to three multiplier chains for transmission in three different directions. Each transmit signal is taken off the MMIC chip by a dielectric waveguide and directed to the antenna system. The receiver module includes three receivers that are selected sequentially to provide a beam azimuth scanning function. A reference local oscillator is provided at the VCO frequency by electromagnetic radiative coupling from the VCO of the transmitter module. Information on the location and relative speed of a radar target are obtained by comparing the frequency of the signal reflected by the target with the frequency of the signal radiated by the transmitter module. Quadrature mixers are used for each receiver channel to output low frequency data signals containing amplitude and phase information on the received reflected signal. Radar directional discrimination is achieved by sequential selection of the mixer output signals.

11 Claims, 5 Drawing Sheets

DOPPLER RADAR SYSTEM FOR AUTOMOTIVE VEHICLES

TECHNICAL FIELD

The present invention relates to radar systems and, in particular, to a continuous wave Doppler radar system designed for automotive vehicles.

BACKGROUND OF THE INVENTION

One solution for reducing traffic congestion on highways is to make existing highways more efficient through automation. To be safe and effective, however, automated highways require means for positioning vehicles within lanes as well as maintaining optimum distance between vehicles. Therefore, fully automated highway systems require sensor and data processing systems to detect and control the separation of moving vehicles.

Positioning vehicles on an automated highway, such as the proposed Intelligent Vehicle Highway System (IVHS), is complicated by the clutter of unwanted information from the environment that is continually received by any sensor system. Provisions must be made for system calibration, changing weather, vehicles entering and exiting the highway, and numerous other obstacles that might be encountered. Various systems have been proposed for automated highways, including those employing passive systems such as stereo vision for measuring distance between vehicles and active sensors such as mm wave radar, laser radar, and sonar. The presently known mid available systems, however, have high cost factors and/or technical problems that have not been overcome. In particular, any radar system to be applied to automobile intelligent cruise control (AICC) must have a low manufacturing cost to be commercially acceptable. Given these constraints and the desire to develop automated highways, there is a need for safe, effective, low cost, real time systems for sensing and controlling the separation of automotive vehicles on the highways.

SUMMARY OF THE INVENTION

A preferred embodiment of the present invention comprises a continuous wave (CW) Doppler radar system designed for automotive vehicles. The radar assembly includes two self-contained modules: a transmitter module and a receiver module. Each module includes a waveguide antenna and lens system attached to a monolithic microwave integrated circuit (MMIC) chip that provides all the necessary electronic functions. Each MMIC chip may be attached to a metal base heat sink. The metal base of each module may be conveniently attached (e.g., plugged in or screwed in like a light bulb) to a base plate heat sink that holds the entire radar assembly.

The MMIC of the transmitter module includes a voltage controlled oscillator (VCO) and three amplifier multiplier chains. The VCO provides a low power signal at a lower VCO frequency that is switched sequentially to the three amplifier multiplier chains for transmission in three different directions as higher frequency transmit signals. The transmit signals produced by the transmitter are frequency modulated by a ramp signal applied to the VCO. Each transmit signal is taken off the MMIC chip by a dielectric waveguide and directed to the appropriate radiative launch point with respect to the transmit lens.

The MMIC of the receiver module includes a local oscillator amplifier, a multiplier, and three receivers that may be selected sequentially to provide a beam azimuth scanning function. The reference local oscillator for the receiver module is provided at the VCO frequency by electromagnetic radiative coupling from the VCO of the transmitter module. Use of the lower VCO frequency for local oscillator coupling in conjunction with a waveguide receiver antenna that has a high pass characteristic prevents the possibility of leakage of the local oscillator into the receiver input port by way of the receiver waveguide antenna feed.

Information on the location and relative speed of a radar target are obtained by comparing the frequency of the signal reflected by the target and received by the receiver module with the concurrent frequency of the transmitter module. Quadrature mixers are used for each channel of the receiver module to output two data signals containing amplitude and phase information on the reflected signal. The frequency of the output signals is very low, generally in the range of a few Hz to 50 kHz, for example.

A principal object of the invention is a radar system for automotive vehicles. Features of the invention include separate radar transmitter and receiver modules having MMIC chips coupled by electromagnetic signals at a frequency lower than the transmitted frequency. An advantage of the invention is a low-cost, modular Doppler radar system for automotive vehicles.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
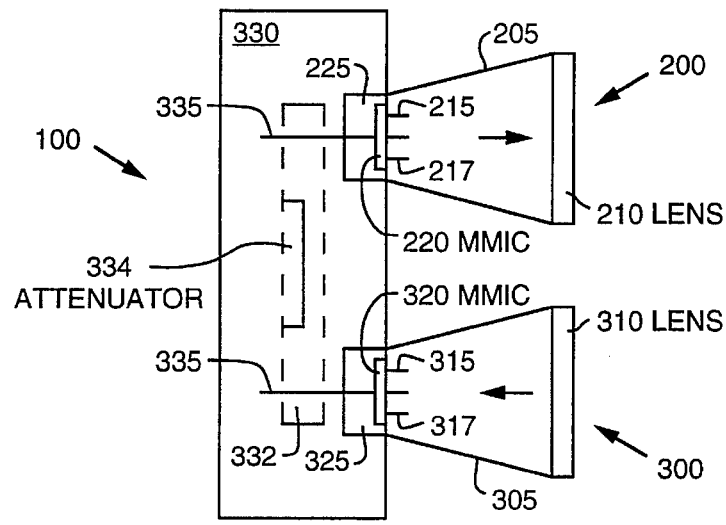
FIG. 1 is a schematic diagram of a modular radar system of the present invention.

The present invention, in its preferred embodiments, comprises a low cost, continuous wave (CW) Doppler radar system designed for automotive vehicles. As illustrated in FIG. 1, the radar assembly 100 includes a transmitter module 200 and a receiver module 300. Each module includes an antenna system comprising a horn (205, 305), a lens (210, 310) mounted in and supported by the horn, and a waveguide system. In preferred embodiments, the waveguide systems include three waveguide antenna elements 215–217 and 315–317, respectively. Each waveguide system connects the respective antenna system to a monolithic microwave integrated circuit (MMIC) chip (220, 320) that provides all the necessary electronic functions. The antenna horns (205, 305), which hold the lenses (210, 310) in position with respect to the MMIC chips (220, 320), may be fabricated from low cost molded plastic. Each MMIC chip (220, 320) may be attached to a metal base heat sink (225, 325). The metal base (225, 325) of each module (200, 300) may be conveniently attached (plugged in, clipped on, or screwed in like a light bulb, for example) to a base plate heat sink 330 that holds the entire radar assembly 100.

Figure 2:
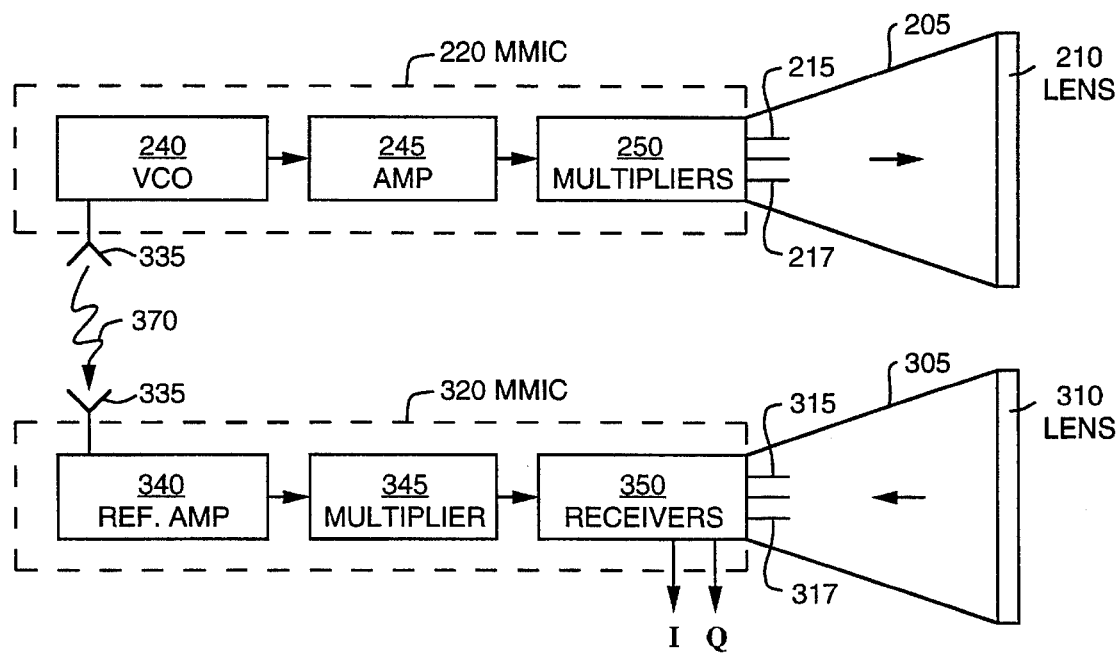
FIG. 2 is a schematic diagram of the transmitter and receiver modules of the radar system of the present invention.

MMIC chips 220 and 330 of FIG. 1 are shown in greater detail in FIG. 2. MMIC chip 220 of transmitter module 200 includes a voltage controlled oscillator (VCO) 240, an amplifier 245, and a system of multipliers 250. MMIC chip 320 of receiver module 300 includes a local oscillator amplifier 340, a multiplier 345, and a system of receivers 350. VCO 240 provides the VCO frequency by electromagnetic radiative coupling 370 (as between simple wire antennas 335, for example) to amplifier 340, thereby providing the reference local oscillator for receiver module 300.

Figure 3:
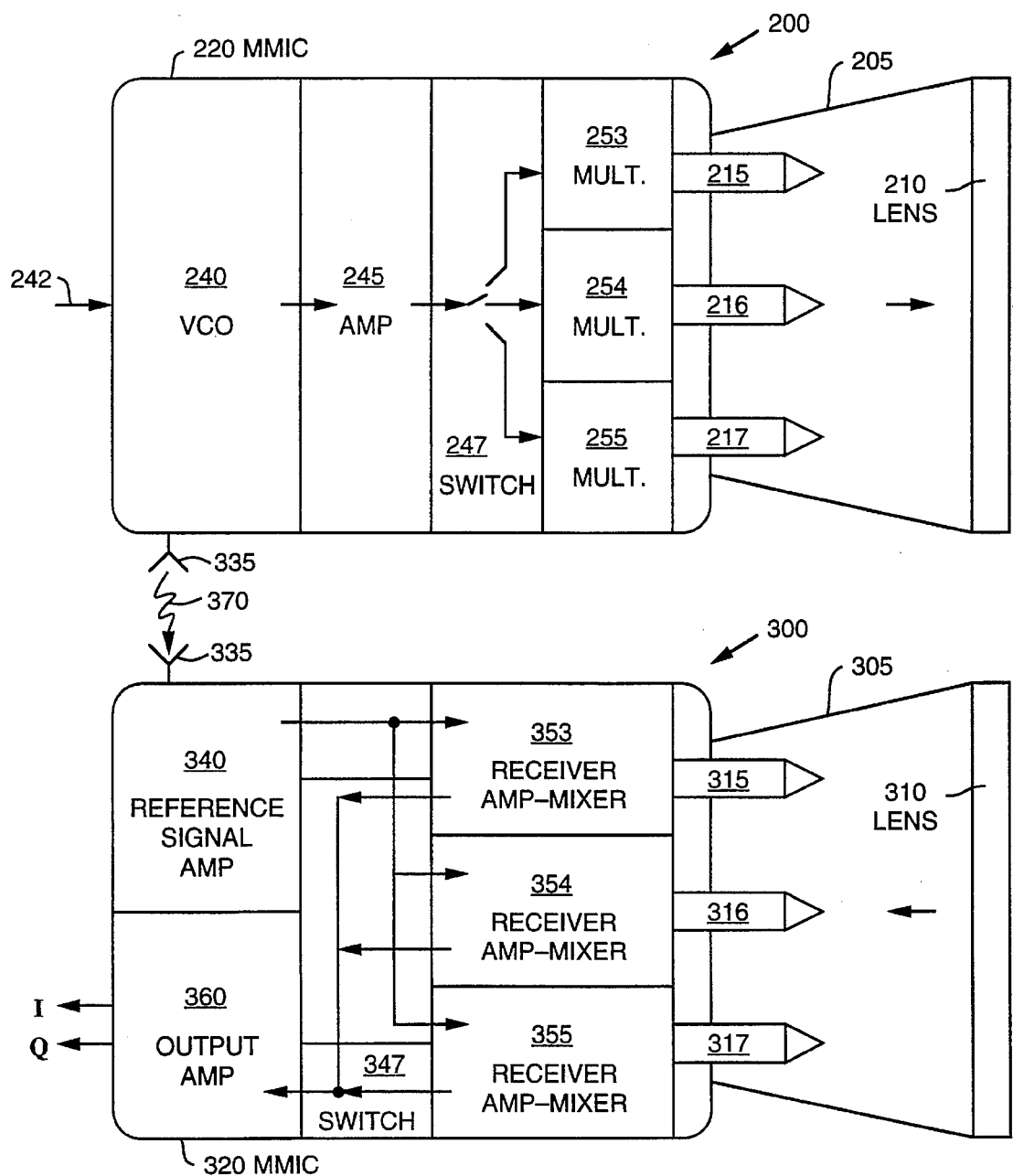
FIG. 3 is a schematic diagram of the functional components of the transmitter and receiver modules of the present invention.

The functional components of transmitter module 200 and receiver module 300 are shown in greater detail in FIG. 3. VCO 240 provides a low power signal at a VCO frequency, which is typically at some integer fraction (i.e., ½, ⅓, ¼, etc.) of the transmit frequency of radar system 100. Generally, the radar transmit frequency is established by a government agency that allocates electromagnetic frequency bands. One embodiment of the present invention is designed to operate at a transmit frequency of 77 GHz, for example, which is the frequency assigned in some European countries for automotive radar systems. The VCO frequency signal generated by VCO 240 is amplified by amplifier 245 and switched sequentially by switching means 247 to a plurality of multipliers, such as multipliers 253–255, that generate higher frequency transmit signals. The transmit signals may be frequency modulated by a ramp signal 242, typically applied to a voltage dependent capacitor in VCO 240, for example. Each transmit signal is taken off MMIC chip 220 by a dielectric waveguide antenna, such as waveguide antenna 215, for example. Waveguide antennas 215–217 (315–317) are designed for radiating (receiving) from the end remote from MMIC chip 220 (320) and may comprise dielectric material having a high index of refraction or semiconductor material such as GaAs or Si, for example. In operation, waveguide antenna 215, for example, directs the transmit signal from multiplier 253 to the appropriate radiating point with respect to lens 210 for radiation in the desired direction. The plurality of waveguide antennas 215–217 in conjunction with lens 210 allow the high frequency signals to be transmitted in a corresponding plurality of directions ahead of the automotive vehicle. Preferred embodiments of the invention use three transmitter waveguide antennas 215–217 (and a corresponding three receiver waveguide antennas 315–317) to provide sufficient radar azimuth coverage in front of the automotive vehicle.

Figure 4:
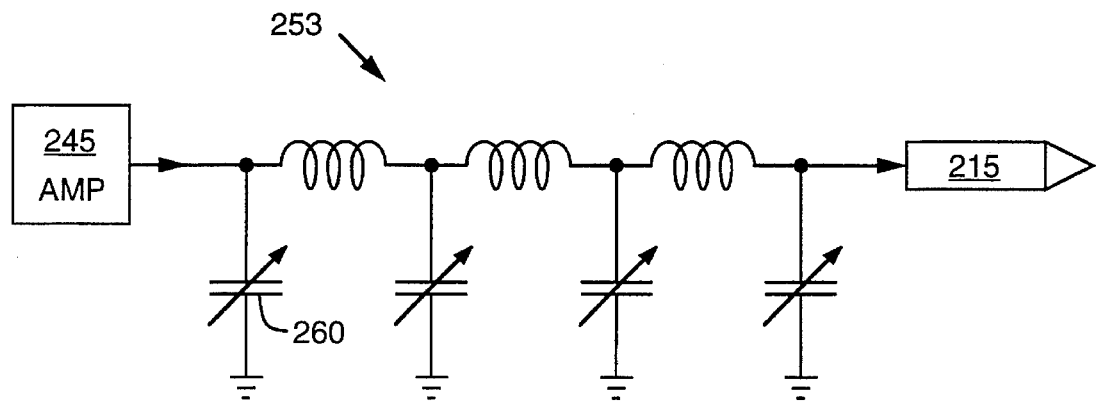
FIG. 4 is a schematic circuit diagram of a multiplier of a transmitter module of the present invention.
Figure 5:
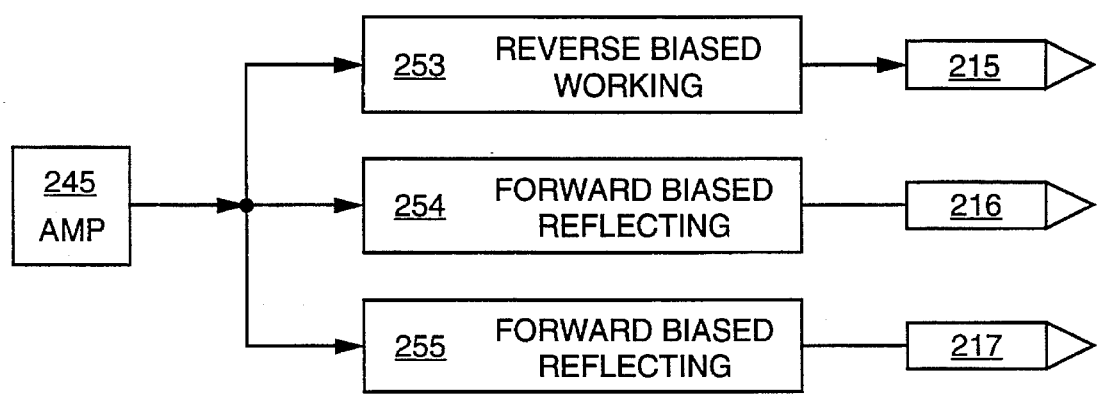
FIG. 5 is a schematic block diagram illustrating the switching function of the multipliers of the present invention shown in FIG. 4.

A preferred embodiment of a multiplier, such as multiplier 253 of MMIC chip 220, for example, is illustrated in the schematic circuit diagram of FIG. 4. Multiplier 253 may comprise a plurality of varactors 260 connected in a nonlinear transmission line system to multiply the frequency of the amplified VCO signal from amplifier 245 for input to waveguide antenna 215. In a working multiplier 253, varactors 260 are reverse biased. The function of switching means 247 can be achieved within the multipliers by forward biasing the varactors 260. When forward biased, varactors 260 become short circuits, and multipliers with forward biased varactors reflect the VCO signal received from amplifier 245. As shown in FIG. 5, the switching function 247 can be accomplished by reverse biasing the varactors 260 in the selected (working) multiplier, such as multiplier 253 in this example, and forward biasing the varactors 260 in the deselected (reflecting) multipliers 254 and 255.

One purpose of the present invention is to provide an automotive radar system at a low cost. In conventional mm wave devices, waveguides are typically fabricated by machining metal to the appropriate dimensions. Although the waveguides are generally larger than their associated integrated circuit chips, their dimensions are nevertheless small enough to make machining operations very expensive.

Figure 6A:
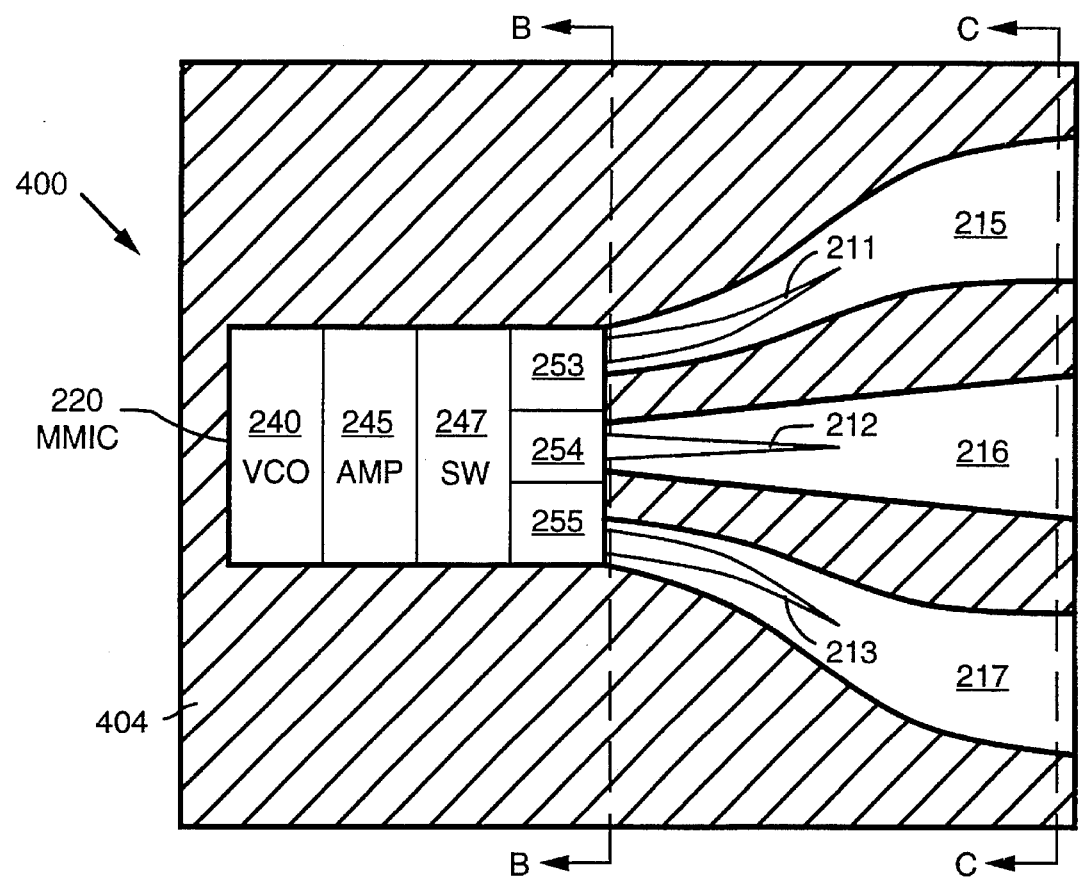
FIG. 6A is a cutaway top plan view of an embodiment of a waveguide antenna system for the present invention.
Figure 6B:
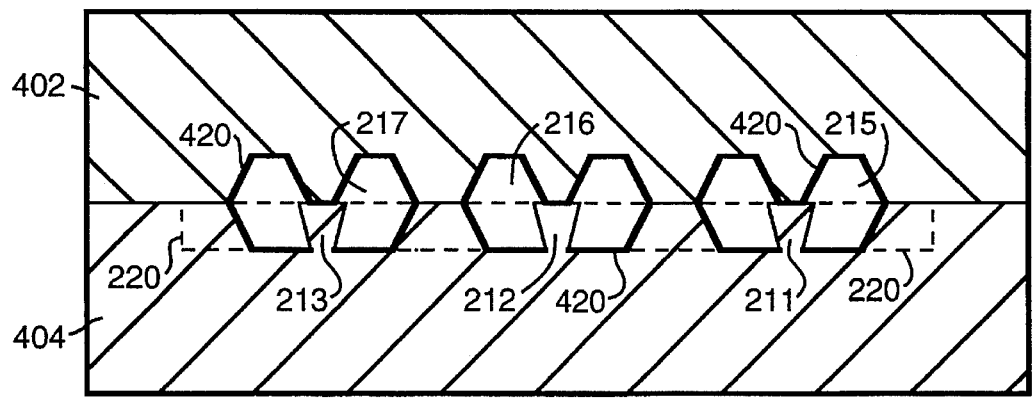
FIG. 6B is a cross sectional view taken at the section lines B—B in FIG. 6A.
Figure 6C:
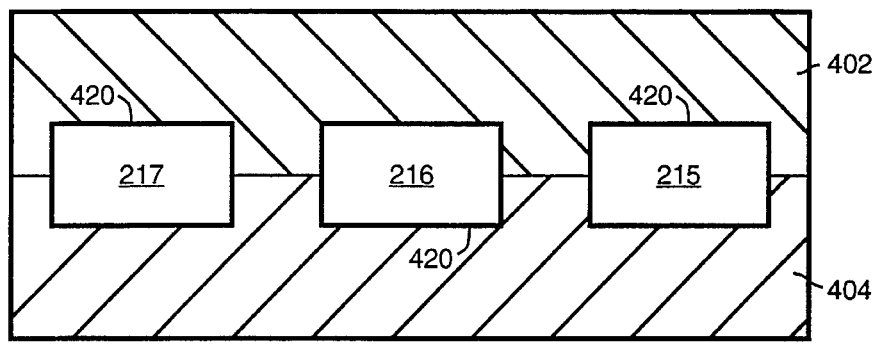
FIG. 6C is a cross sectional view taken at the section lines C—C in FIG. 6A.

FIGS. 6 A, B, and C illustrate an example of a waveguide system 400 designed for low cost fabrication. FIG. 6A comprises a cutaway top plan view of waveguide system 400 associated with MMIC chip 220 of the present invention. FIG. 6B is a cross sectional view taken along the section lines B—B in FIG. 6A, and FIG. 6C is a cross sectional view taken along the section lines C—C. Waveguide system 400 includes an upper section 402 and a lower section 404. In FIG. 6A, upper section 402 is cut away to illustrate dielectric waveguide launchers 211–213, waveguide antenna troughs 215–217, and a recess for retaining MMIC chip 220, all as of which are etched in lower section 404. Sections 402 and 404 may comprise an electrically insulating, thermally conducting material, such as a silicon wafer, for example. Silicon is suggested because it is easily etched to form waveguide troughs, it lends itself to parallel processing of many launching systems, it can be obtained with sufficiently high resistivity, it is cost effective, and it allows embodiments having active devices fabricated on the same substrate used for forming the waveguides. Upper section 402 is etched to mate with lower section 404 when they are sandwiched together, as illustrated in FIG. 6B, to hold MMIC chip 220 in the position indicated by the dotted line rectangle. Before sections 402 and 404 are sandwiched together, the etched inner surfaces of waveguide antenna troughs 215–217, except for dielectric launchers 211–213, are metallized, as shown by bold surfaces 420 in FIGS. 6B and 6C. Waveguide antennas 215–217 comprise expanding troughs, as shown in FIG. 6C, that are shaped to guide the transmitted energy to the proper radiating point with respect to lens 210 (see FIG. 3). Waveguide antenna troughs 215–217 are narrow at the chip end with dielectric launchers 211–213 matching impedance with launching transmission line stubs on multipliers 253–255, respectively, of MMIC chip 220. Dielectric launchers 211–213 in waveguide troughs 215–217 also keep the cut-off frequency below the transmit frequency of the antenna system.

FIG. 6B also illustrates that sections 402 and 404 are not identical because they perform slightly different functions. Lower section 404 holds MMIC chip 220 and presents, at the chip edge, one-half height waveguide antenna troughs with dielectric ridges (i.e., waveguide launchers 211–213) matching the chip metal line. Upper section 402 presents corresponding one-half height waveguide antenna troughs with metallized ridges to effect a connection to the transmission line of chip 220, thus launching the transmitter energy into the waveguide ridges 211–213. Machining and etching of sections 402 and 404 are accomplished to flare the waveguide antenna troughs into full size at their ends toward lens 210, as shown in FIG. 6C. The waveguide system for receiver module 300 is fabricated and functions similarly to the transmitter waveguide antenna system described above.

Figure 7:
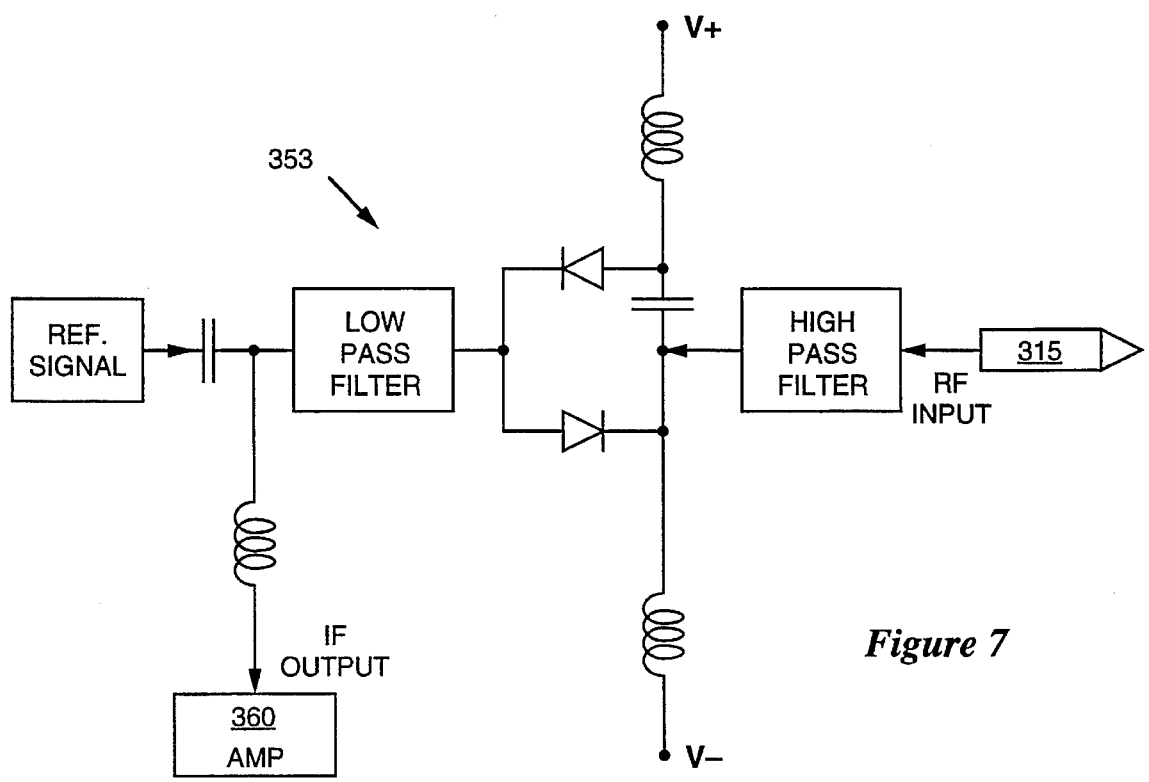
FIG. 7 is a schematic circuit diagram of the functional components of an embodiment of a sub-harmonically pumped, complex signal mixer for the present invention.

Referring again to FIG. 3, receiver module 300 includes a local oscillator amplifier 340 that receives an electromagnetic signal 370, which is bled off VCO 240 of transmitter module 200 at the VCO frequency, to provide a local oscillator signal for receiver module 300. Use of the lower VCO frequency prevents the possibility of leakage of the local oscillator signal into the radar receiver by way of the receiver antenna system and waveguides 315–317, which typically function as high pass filters. The local oscillator signal is routed from amplifier 340 through multiplier 345, which provides the signal to a plurality of receivers 353–355. The number of receivers 353–355 in receiver module 300 typically corresponds to the number of multipliers 253–255 in transmitter module 200. Each receiver 353–355 generally includes a low noise amplifier (LNA) for amplifying the received reflected signal and a complex signal mixer for comparing the frequency of the received reflected signal with the frequency of the multiplied local oscillator signal to generate a difference frequency. In preferred embodiments, the complex signal mixers of receivers 353–355 may be sub-harmonically pumped by the non-multiplied VCO signal. An example of a sub-harmonically pumped complex signal mixer of receiver 353 is illustrated schematically in FIG. 7. The mixers may be selected sequentially at their baseband frequency output ports to provide a beam azimuth scanning function. These features avoid the necessity of high frequency switching and allow compact, low cost circuit design and low noise operation with the use of heterojunction bipolar transistor (HBT) technology.

In operation, radar assembly 100 transmits high frequency signals that may be switched among waveguide antennas 215–217, as described above, to provide radar azimuth coverage. However, for embodiments of the invention having well-controlled receiver antenna side lobes, actual switching of the transmitter signals may not be necessary. A radar target located in the transmitted beam will reflect signals back toward receiver module 300 at a frequency related to the frequency of the transmitted signal, the distance to the target, and the relative velocity of the target and radar assembly mounted on the automotive vehicle. Information on the location and relative speed of the radar target are obtained by comparing the frequency of the signal reflected by the target and received by receiver module 300 with the frequency of the concurrent signal radiated by transmitter module 200. Quadrature mixers may be used for each channel of receiver module 300 to compare the signals and provide the results to a low frequency output amplifier 360. Amplifier 360 provides output data signals (I, Q) that contain amplitude and phase information on the received reflected signal that correspond to location and relative speed of the radar target. Output data signals (I, Q) may be selected sequentially from receivers 353–355 using a switch means 347. The frequency of the output signals (I, Q) is very low, generally in the range of a few Hz to 50 kHz, for example.

As described above and best shown in FIG. 1, the present invention provides a low cost radar assembly that comprises a transmitter and a receiver that may comprise separate "light bulb" type, easily replaceable modules. The modules may be screwed or plugged into a base plate heat sink 330 that supports the entire assembly 100. Base plate 330 may include a simple means 332, such as a waveguide, for propagating coupling signal 370 between wire antennas 335 at the VCO frequency. Coupling means 332 may also include a means 334 for controlled attenuation of the radiated coupling signal 370 to provide local oscillator level control.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. A Doppler radar system for an automotive vehicle, comprising a transmitter module comprising a first monolithic microwave integrated circuit (MMIC) chip for generating a transmit signal and a first waveguide antenna system connected to said transmitter MMIC chip for transmitting said transmit signal;

said first MMIC chip comprising a voltage controlled oscillator (VCO) for generating a VCO frequency signal and a multiplier connected between said VCO and said first waveguide antenna system for multiplying said VCO frequency signal to produce said transmit signal;

a receiver module comprising a second MMIC chip and a second waveguide antenna system connected to said second MMIC chip for receiving a reflected transmit signal;

said second MMIC chip comprising a low noise receiver amplifier connected to said second waveguide antenna system, said low noise receiver amplifier including;

means for mounting said transmitter module and said receiver module; and means for coupling said transmitter VCO frequency signal generated by said first MMIC chip to said second MMIC chip by electromagnetic radiation.

2. The Doppler radar system of claim 1, wherein said transmitter module further comprises:

a three multipliers connected to said VCO;

said first waveguide antenna system comprising three transmitter waveguide elements, each of said transmitter waveguide elements connected to a corresponding one of said multipliers; and said transmitter waveguide elements for transmitting said transmit signal in three azimuth directions.

3. The Doppler radar system of claim 2, wherein said first MMIC chip further comprises means for switching said transmit signal among said three transmitter waveguide elements.

4. The Doppler radar system of claim 3, wherein said receiver module further comprises:

three complex signal mixers;

three low noise amplifiers, each of said low noise amplifiers connected to a corresponding one of said complex signal mixers; and said second waveguide antenna system comprising three receiver waveguide antenna elements, each of said receiver waveguide antenna elements connected to a corresponding one of said low noise amplifiers for receiving said reflected transmit signal from a corresponding one of said azimuth directions.

5. The Doppler radar system of claim 4, wherein each of said mixers comprises means for comparing said received reflected signal with a local signal corresponding to said transmit signal for obtaining amplitude and phase information corresponding to location and relative speed of said radar target.

6. The Doppler radar system of claim 5, further comprising means for outputting data signals containing said amplitude and phase information corresponding to said location and relative speed of said radar target.

7. The Doppler radar system of claim 6, wherein said transmitter and receiver modules each comprise a horn assembly for mounting a lens in spaced apart relationship with said waveguide antenna elements.

8. A Doppler radar system for an automotive vehicle, comprising a transmitter module comprising a first monolithic microwave integrated circuit (MMIC) chip for generating a transmit signal and a first waveguide antenna system connected to said first MMIC chip for transmitting said transmit signal;

said first waveguide antenna system comprising three transmitter waveguide elements, a first horn, and a first lens mounted in said first horn in spaced apart relationship with said transmitter waveguide elements;

said first MMIC chip comprising a voltage controlled oscillator (VCO) for generating a VCO frequency signal and three multipliers connected to said VCO, each of said multipliers connected to a corresponding one of said transmitter waveguide elements for multiplying said VCO frequency signal and thereby generating said transmit signal;

a receiver module comprising a second MMIC chip and a second waveguide antenna system connected to said second MMIC chip for receiving a signal transmitted by said transmitter module and reflected by a radar target;

said second waveguide antenna system comprising three receiver waveguide elements, a second horn, and a second lens mounted in said second horn in spaced apart relationship with said receiver waveguide elements said second MMIC chip comprising three low noise receiver amplifiers each connected to a corresponding one of said receiver waveguide elements, and three subharmonically pumped complex signal mixers each connected to a corresponding one of said low noise receiver amplifiers;

means for mounting said transmitter module and said receiver module; and means for coupling said transmitter VCO frequency signal generated by said first MMIC chip to said second MMIC chip by electromagnetic radiation.

9. The Doppler radar system of claim 8, wherein said first MMIC chip further comprises means for switching said transmit signal among said three transmitter waveguide elements.

10. The Doppler radar system of claim 9, wherein each of said subharmonically pumped complex signal mixers comprises means for comparing said received reflected signal with a signal corresponding to said transmitter VCO frequency signal for obtaining amplitude and phase information corresponding to location and relative speed of said radar target.

11. The Doppler radar system of claim 10, further comprising means for outputting data signals containing said amplitude and phase information corresponding to said location and relative speed of said radar target.

* * * * *